UNITED STATES PATENT OFFICE.

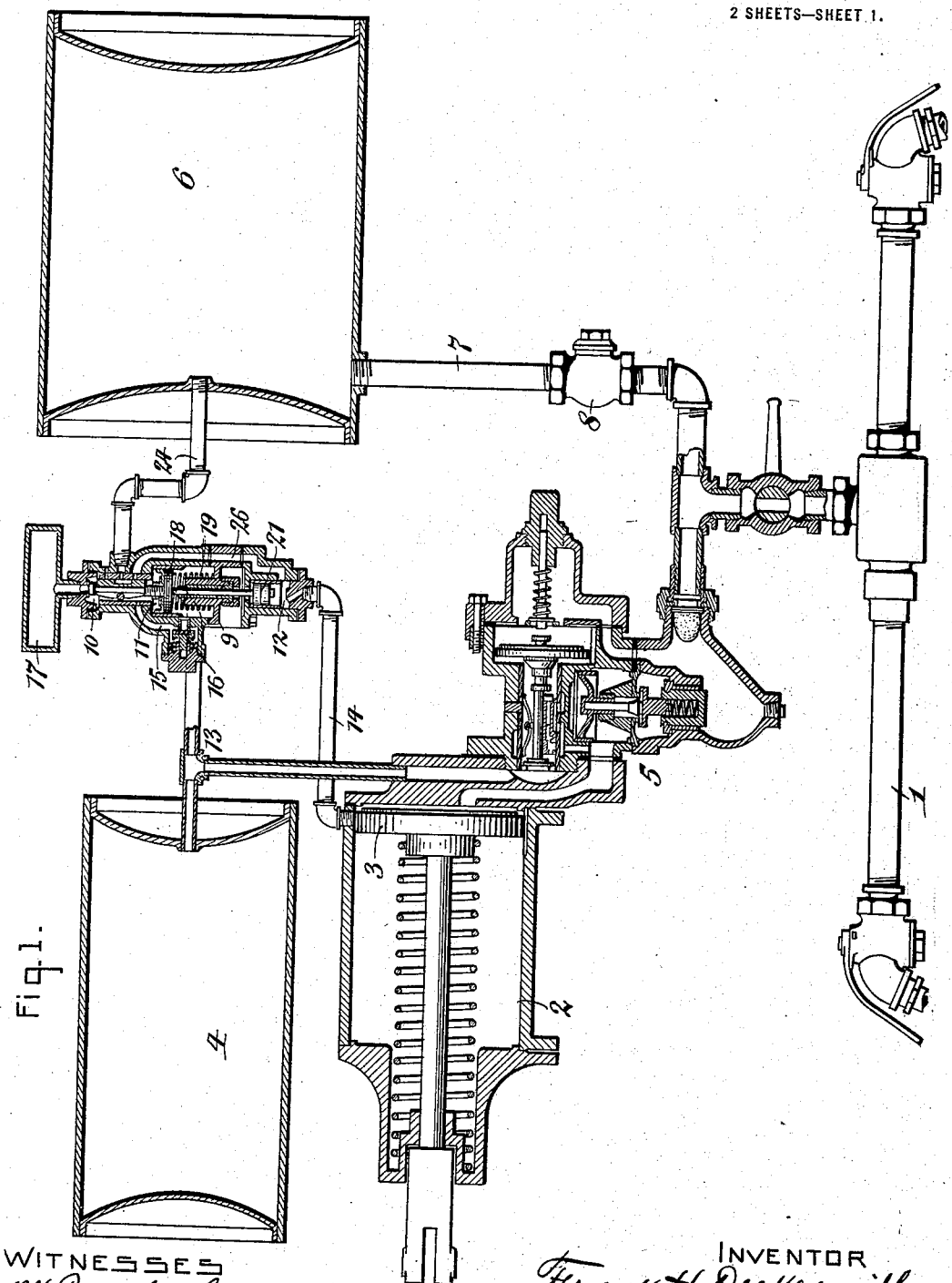

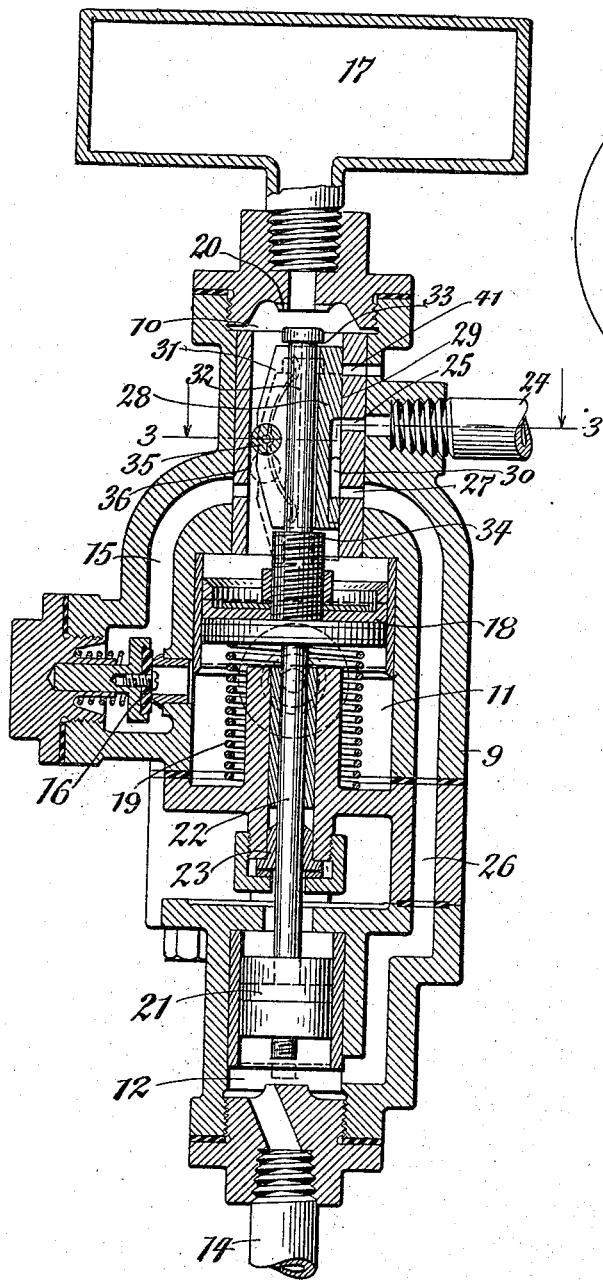

FRANK H. DUKESMITH, OF BUFFALO, NEW YORK, ASSIGNOR TO THE UNITED STATES AIR BRAKE CORPORATION, OF BUFFALO, NEW YORK, A CORPORATION OF NEW YORK.

AIR-BRAKE SYSTEM.

1,217,580.  Specification of Letters Patent.  Patented Feb. 27, 1917.

Application filed June 18, 1913, Serial No. 774,281. Renewed September 15, 1916. Serial No. 120,415.

*To all whom it may concern:*

Be it known that I, FRANK H. DUKESMITH, a citizen of the United States, residing at Buffalo, in the county of Erie and State of New York, have invented new and useful Improvements in Air-Brake Systems, of which the following is a specification.

This invention relates to a brake system operated by compressed air or fluid pressure.

The air brake equipment commonly used on cars consists, primarily of a triple valve, auxiliary reservoir, brake cylinder and piping connecting the triple valve with the source of fluid pressure.

The size of the auxiliary reservoir is governed by the size of the brake cylinder to which it is connected. In other words the size of the auxiliary reservoir cannot be increased beyond a certain volume capacity. This is made necessary by the fact that when a full service or emergency application of the brake is made the supply port leading from the auxiliary reservoir to the brake cylinder remains open, thereby causing the pressure in the brake cylinder and auxiliary reservoir to equalize. This makes it necessary that the auxiliary reservoir must be correctly proportioned to the size of the brake cylinder in order to prevent the cylinder pressure from becoming too high when the cylinder and auxiliary reservoir are in full communication.

The conditions being as above stated, the results are as follows:

1st:—Should the brake cylinder volume become enlarged by reason of increased travel of the cylinder piston, due to wear of brake shoes, etc., the resulting working power would not be anything like the proper amount, for the reason that when a reduction of ten pounds is made from the brake pipe, the triple valve will cause the auxiliary to discharge into the cylinder just enough air as will be necessary to reduce the auxiliary pressure below that which is left in the brake pipe, when the triple valve will automatically shut off the supply from the auxiliary reservoir to the cylinder. The amount of air discharged from the auxiliary reservoir is governed entirely by the amount of reduction made on the brake pipe, but the pressure generated in the brake cylinder depends entirely upon the relative size of the cylinder to the auxiliary reservoir. Should the cylinder be enlarged by reason of excessive piston travel, the force generated by the air it received from the auxiliary reservoir would be correspondingly decreased. When everything is as it should be, a ten pound brake pipe reduction should generate a pressure of 25 pounds per square inch in the cylinder. Therefore, the expansion of ten pounds of auxiliary reservoir pressure into a cylinder that has been enlarged by increased piston travel will not generate the proper braking power which the equipment was intended to develop. And as the brake cylinder force is multiplied from 8 to 10 times by the levers which intervene between the cylinder and the brake shoes, a loss of only a few pounds of pressure in the cylinder means a very heavy loss of braking power at the brake shoes. A loss of only 5 pounds from a 14 inch passenger brake cylinder means the loss of over 9,000 pounds of total braking power on the car. A very little increase of piston travel will produce a loss of 5 pounds in the cylinder pressure.

2nd:—After the auxilary reservoir has discharged air into the brake cylinder and the triple valve has closed the supply port, then should the packing leather in the brake cylinder be dry or defective, it will permit the cylinder pressure to gradually leak away and destroy the efficiency of that brake entirely.

3rd:—Should a train become parted on a grade, the brake would, of course, apply automatically, but as this would exhaust all the air from the brake pipe there would then be still another means afforded for the brake cylinder pressure to leak away, and that is past the emergency check valve in the triple valve. As these check valves all leak more or less, it means that the combined leakage past the cylinder packing leather and the emergency check valve, to say nothing of the leakage past the triple piston, would very shortly empty the brake cylinder and auxiliary reservoir of their pressure and the brake would be useless, causing the train to run away and become wrecked.

As the present type of brake equipment does not permit the enlarging of the auxiliary reservoir above its proper proportion to the brake cylinder, it is readily seen that the small volume contained in the auxiliary reservoir would not keep a brake applied for any great length of time against the above mentioned leakage, which as is well known, is common to the brakes on freight and passenger cars.

Uneven piston travel and brake cylinder leakage have always been recognized as the two great evils of the automatic air brake, as they not only mean great danger in the handling of trains, but they are a constant source of expense to railroads by reason of the fact that these defects cause such uneven braking power on the cars that heavy surges and shocks are inevitable, which means that the cars are seriously damaged every time the brakes are applied and released.

The object of the present invention is to insure that the brake cylinder will at all times receive the correct braking pressure in proportion to the brake pipe reduction, regardless of piston travel, and then hold the correct pressure during brake application regardless of cylinder leakage.

In the accompanying drawings:

Figure 1 is a diagrammatic view of an air brake system embodying my invention. Fig. 2 is a longitudinal section of the regulating maintaining valve mechanism, on an enlarged scale, and showing the valve member in a position different from that shown in Fig. 1. Fig. 3 is a cross section in line 3—3, Fig. 2.

Similar characters of reference indicate corresponding parts throughout the several views.

This invention is applicable to any standard type of air brake equipment as now commonly used and only those elements which are directly associated with the present improvements are therefore shown in the drawings. As there shown the same comprise a train pipe or line 1 which receives its supply of compressed air or fluid pressure from any suitable source, a brake cylinder 2 containing a piston 3 which is operatively connected with the usual brake rigging, an auxiliary fluid pressure reservoir 4, and a triple valve 5 which is connected by suitable piping or conduits with the train pipe, brake cylinder and auxiliary reservoir and operates in the usual and well known manner so as to permit the pressure fluid to pass from the train pipe into the auxiliary reservoir when the brakes are released and to cause the pressure fluid to pass from the auxiliary reservoir into the brake cylinder for applying the brakes.

The regulating maintaining valve mechanism forming the subject of this invention and associated with the above mentioned elements of the air brake system is constructed as follows:

6 represents a fluid pressure supply reservoir which is connected with the train pipe by a conduit 7 containing a non-return check valve 8 which only opens toward the supply reservoir so as to permit air to pass to the same from the train pipe but prevents the air from backing up through this conduit from the supply reservoir.

9 represents the body of the compensating valve mechanism which may be of any suitable construction to permit of easily and economically making the same and permit the working parts to be assembled in the interior thereof. As here shown this body is provided in its upper end with a cylindrical initial pressure chamber 10, in its central part with an auxiliary reservoir chamber 11 and in its lower end with a brake cylinder chamber 12. The auxiliary reservoir chamber is connected by a conduit 13 with the auxiliary reservoir and the parts associated therewith, and the brake cylinder chamber is connected by a conduit 14 with the brake cylinder. 15 represents a conduit preferably formed in the side of the body 9 and adapted to connect the auxiliary reservoir chamber and the initial pressure chamber and containing a non-return check valve 16 or similar means for permitting the fluid pressure of the auxiliary reservoir to pass from the auxiliary reservoir chamber into the initial pressure chamber but preventing backward movement of the pressure fluid from the latter.

For the purpose of increasing the capacity of the initial pressure chamber the body of the compensating valve mechanism is provided with an extension pressure chamber 17 connected with the upper end of the initial pressure chamber and practically forming a part of the latter.

Between the initial pressure chamber and auxiliary reservoir chamber is arranged a piston 18 of large area which forms a separation between these chambers and is movable axially relatively thereto and has its opposite sides exposed to the interior of the same. This piston is yieldingly moved from the auxiliary reservoir chamber toward the initial pressure chamber by means which preferably comprise an equalizing spring 19 arranged in the auxiliary reservoir chamber and bearing at its lower end against the bottom of this chamber while its upper end bears against the underside of said large area piston. The upward movement of the large area piston under the action of the spring 19 is limited by a stop device which preferably consists of the longitudinal stem 32 of said piston projecting upwardly therefrom and adapted to engage a shoulder 20 at the top of the initial pressure chamber, as shown in Fig. 1.

Within the brake cylinder chamber is arranged a piston 21 of small area compared with the large area piston 18 and is operatively associated or connected with the latter preferably by means of a piston rod 22 extending upwardly from the small area piston through a stuffing box 23 in the bottom of the auxiliary reservoir chamber and loosely engaging the underside of the large area piston.

Communication is adapted to be established or disestablished between the supply reservoir and the brake cylinder chamber and brake cylinder through a delivery conduit which is opened or closed by a valve member responsive to variations in pressures in the initial pressure chamber and the auxiliary reservoir chamber. This conduit is preferably formed by a pipe 24 extending from the supply reservoir to a port 25 in the side of the initial pressure chamber and a passage 26 formed in the body 9 and extending from the brake cylinder chamber to a port 27 in the side of the initial pressure chamber adjacent to the port 25. The opening and closing of this delivery conduit is effected preferably by a longitudinally movable slide valve 28 engaging with a seat 29 on the inner side of the initial pressure chamber and provided with a cavity 30 facing this seat.

This slide valve is operatively connected with the large area piston so as to move therewith this being preferably effected by providing the back of the slide valve with a longitudinal groove 31 which receives the piston stem 32 projecting upwardly from the large area piston and provided with upper and lower shoulders 33, 34 engaging with the upper and lower ends of the slide valve. 35 represents an anti-friction roller engaging with a track 36 formed lengthwise on the inner side of the initial pressure chamber opposite the valve seat 29 and having trunnions 37 at its opposite ends which are arranged in notches 38 in the slide valve. The latter is yieldingly held against its seat preferably by two springs 39 each of which engages its central part with the trunnion at one end of the anti-friction roller while its extremities bear against a shoulder 40 on the slide valve.

In the uppermost position of the slide valve its cavity 30 only communicates with the port 25 while its lower solid part covers the port 27 and its upper solid part covers a vent or exhaust port 41 leading from the interior of the initial pressure chamber to the external atmosphere adjacent to the port 25, as shown in Fig. 1. Upon moving the slide valve downwardly into its central or intermediate position its upper solid part still covers the exhaust port 41 and its cavity communicates with both ports 25, 27, as shown by full lines in Fig. 2, thereby opening the conduit connecting the supply reservoir and the brake cylinder and brake cylinder chamber, and when the slide valve reaches the lower end of its stroke movement its upper solid part uncovers the exhaust port 41 and its cavity communicates only with the port 27, thereby venting the initial pressure chamber to the atmosphere and shutting off communication between the supply reservoir and the brake cylinder and brake cylinder chamber.

When air from the auxiliary reservoir 4 enters the chamber 11 it passes the check valve 16 and fills chamber 10 equally with the chamber 11. The regulating maintaining valve mechanism will then operate as follows:

Assuming that the brake pipe and auxiliary reservoir are charged to 70 pounds, then when a ten-pound reduction is made on the brake pipe ten pounds and a fraction will flow from the auxiliary reservoir into the brake cylinder and the triple valve will automatically shut off any further flow of air from the auxiliary reservoir to the cylinder. Should the volume capacity of the brake cylinder be enlarged as the result of excessive piston travel, the air that went into the cylinder would expand at a much lower pressure than it would if the piston travel were correct, and consequently develop a correspondingly low braking force against the cylinder piston.

Should the charge from the auxiliary reservoir build up a pressure in the brake cylinder of only 15 pounds, there would then be 15 pounds to the square inch pushing against the small piston 21 in the chamber 12 and 60 pounds in chamber A side of the large piston while 70 pounds would be pushing against the same from the chamber 10 side of the large piston. The difference in areas of the large and small pistons is such that with the conditions as above stated the heavy pressure in the chamber 10 would force the pistons down and move the slide valve 28 in position to connect the supply reservoir 6 with the conduit passage leading to the underside of the small piston and into the cylinder and when the pressure in the brake cylinder builds up so that the pressure on the underside of the small piston combined with the pressure of the fluid in the chamber 11 against the large piston equals the pressure of the fluid in the chamber 10 against the large piston, the equalizing spring 19 in chamber 11 will then push the large piston back and cause the slide valve 28 to shut off the flow of air from the supply reservoir to the brake cylinder.

Should the pressure leak out of the brake cylinder, the pressure on the cylinder side of the small piston 21 would, of course, be also reduced, and as the low pressure in chamber 11 without the help of brake cylinder pressure would not be strong enough to resist the pressure in chamber 10, the large piston would again move down and place the slide valve 28 in position to again feed air from the supply reservoir to the brake cylinder and again build up that pressure to the required amount, when the equalizing spring 19 would again push the large piston and slide valve back to normal position. This action will continue until the pressure is changed in chamber 11 or the triple valve is moved to release position in the usual way.

After a five or ten pound brake pipe reduction has been made and the brake cylinder pressure has been correctly built up and maintained by the regulating maintaining or compensating valve mechanism, then should another brake pipe reduction be made, the valve mechanism would cause the brake cylinder pressure to build up and be maintained to the correct amount in proportion to the brake pipe reduction, just the same as it did when the first reduction was made. The valve regulates and maintains the brake cylinder pressure at the correct amount just the same as though the piston travel was correct and there were no leaks.

When the triple valve is moved to release position it causes a sudden drop of cylinder pressure, which in turn causes the pressure in chamber 10 to drive the large piston down until the end of the slide valve passes the vent port 41 in chamber 10, permitting the pressure in that chamber to quickly equalize down to the pressure in chamber 11 and then the spring 19 pushes the large piston and slide valve back to normal position. The valve is then ready for the next brake application.

This regulating maintaining or compensating valve mechanism is extremely simple in its construction and will do its work in combination with any standard type of triple valve and requires no change whatever in the usual locomotive equipment nor any different operation from that of any other brake equipment. When this valve is attached to any car brake it simply compels the brake to correctly perform the functions for which the brake was designed.

I claim as my invention:

1. In an air brake system, the combination of a train pipe, a supply reservoir which is charged with fluid pressure from said train pipe, a brake cylinder, an auxiliary reservoir, a triple valve associated with the train pipe, brake cylinder and auxiliary reservoir, a non-return check valve arranged in the conduit connecting the train pipe and the supply reservoir, and a regulating valve mechanism associated with said supply reservoir, auxiliary reservoir and brake cylinder and adapted to permit the passage of fluid pressure from the supply reservoir to the brake cylinder when the pressure in the auxiliary reservoir drops below its initial pressure.

2. In an air brake system, the combination of means for supplying fluid pressure, a brake cylinder, an auxiliary reservoir, a triple valve associated with said fluid pressure supplying means, auxiliary reservoir and brake cylinder, and a pressure maintaining valve mechanism, comprising an auxiliary reservoir chamber connected with the auxiliary reservoir, an initial pressure chamber connected with the auxiliary reservoir chamber, means for cutting off communication between said auxiliary reservoir chamber and said initial pressure chamber, a large area piston movably arranged between said initial pressure chamber and said auxiliary reservoir chamber, a spring tending to move said large area piston toward said initial pressure chamber, a brake cylinder chamber connected with the brake cylinder and adapted to be put into communication with said fluid pressure supplying means, a small area piston arranged in said brake cylinder chamber and operatively associated with said large area piston, and means operatively connected with said large area piston for controlling the passage of fluid pressure from said fluid pressure supplying means to said brake cylinder chamber and said brake cylinder.

3. In an air brake system, the combination of means for supplying fluid pressure, a brake cylinder, an auxiliary reservoir, a triple valve associated with said fluid pressure supplying means, auxiliary reservoir and brake cylinder, and a pressure maintaining valve mechanism comprising an auxiliary reservoir chamber connected with the auxiliary reservoir, an initial pressure chamber connected with the auxiliary reservoir chamber, means for cutting off communication between said auxiliary reservoir chamber and said initial pressure chamber, a large area piston movably arranged between said initial pressure chamber and said auxiliary reservoir chamber, a spring tending to move said large area piston toward said initial pressure chamber, a brake cylinder chamber connected with the brake cylinder and adapted to be connected with said fluid pressure supplying means, a small area piston movably arranged in said brake cylinder chamber and operatively associated with said large area piston, and means operatively connected with said large area piston for controlling the passage of fluid pressure from said fluid pressure supplying means to said brake cylinder chamber and said brake cylinder and also controlling an exhaust port leading from the initial pressure chamber.

4. In an air brake system, the combination of means for supplying fluid pressure, a brake cylinder, an auxiliary reservoir, a triple valve associated with said fluid pressure supplying means, auxiliary reservoir and brake cylinder, and a pressure maintaining valve mechanism, comprising an auxiliary reservoir chamber connected with the auxiliary reservoir, an initial pressure chamber connected with the auxiliary reservoir chamber, means for cutting off communication between said auxiliary reservoir chamber and said initial pressure chamber, a large area piston movably arranged between said initial pressure chamber and said auxiliary reservoir chamber, a spring tending to move said large area piston toward said initial pressure chamber, a brake cylinder chamber connected with the brake cylinder and adapted to be connected with said fluid pressure supplying means, a small area piston movably arranged in said brake cylinder chamber and operatively associated with said large area piston, and means operatively connected with said large area piston for controlling the passage of fluid pressure from said fluid pressure supplying means to said brake cylinder chamber and said brake cylinder and also controlling an exhaust port leading from the initial pressure chamber to the atmosphere.

5. In an air brake system, the combination of a train pipe, a brake cylinder, an auxiliary reservoir, a triple valve operatively connected with said train pipe, brake cylinder, and auxiliary reservoir, a fluid pressure supply reservoir connected with the train pipe, a non-return check valve arranged in the conduit connecting the train pipe and supply reservoir and opening toward the latter, and a regulating valve mechanism independent of the triple valve for supplying and maintaining the fluid pressure in the brake cylinder while the brakes are applied, said regulating mechanism comprising an auxiliary reservoir chamber connected with the auxiliary reservoir, an initial pressure chamber connected with the auxiliary reservoir chamber, a non-return check valve arranged in the conduit connecting the auxiliary reservoir chamber and initial pressure chamber and opening toward the latter, a piston of large area exposed on its opposite sides to the fluid pressure in said initial pressure chamber and said auxiliary reservoir chamber, a spring operating to move said large area piston from said auxiliary reservoir chamber toward said initial pressure chamber, a brake cylinder chamber connected with said brake cylinder and adapted to be connected with said supply reservoir, a piston of small area movably arranged in said brake cylinder chamber and operatively connected with the large area piston, and a valve member movable with said large area piston, and controlling ports for opening and closing the conduit connecting the supply reservoir with the brake cylinder and brake cylinder chamber.

6. In an air brake system, the combination of a train pipe, a brake cylinder, an auxiliary reservoir, a triple valve operatively connected with said train pipe, brake cylinder and auxiliary reservoir, a fluid pressure supply reservoir connected with the train pipe, a non-return check valve arranged in the conduit connecting the train pipe and supply reservoir and opening toward the latter, and a regulating valve mechanism independent of the triple valve for supplying and maintaining the fluid pressure in the brake cylinder while the brakes are applied, said regulating mechanism comprising an auxiliary reservoir chamber connected with the auxiliary reservoir, an initial pressure chamber connected with the auxiliary reservoir chamber, a non-return check valve arranged in the conduit connecting the auxiliary reservoir chamber and initial pressure chamber and opening toward the latter, a piston of large area exposed on its opposite sides to the fluid pressure in said initial pressure chamber and said auxiliary reservoir chamber, a spring operating to move said large area piston from said auxiliary reservoir chamber toward said initial pressure chamber, a brake cylinder chamber connected with said brake cylinder and adapted to be connected with said supply reservoir, a piston of small area arranged in said brake cylinder chamber and operatively connected with said large area piston, and a valve member movable with said large area piston, and controlling ports for opening and closing the conduit connecting the supply reservoir with the brake cylinder and brake cylinder chamber and also adapted to open an exhaust port leading from the initial pressure chamber to the atmosphere at the extreme end of the movement of said large area piston toward said auxiliary reservoir chamber.

7. In an air brake system, the combination of a train pipe, a brake cylinder, an auxiliary reservoir, a triple valve operatively connected with the train pipe, auxiliary reservoir and brake cylinder, and means operated by a reduction of pressure in the brake cylinder to admit air to the same from a source of supply and to shut off the admission of air to the brake cylinder by the rise of pressure in the same working in combination with the force of the auxiliary reservoir pressure.

8. In an air brake system, the combination of a train pipe, a brake cylinder, an auxiliary reservoir, a triple valve operatively connected with the train pipe, auxiliary reservoir and brake cylinder, and means operated by a reduction of pressure in the auxiliary reservoir to admit fluid pressure from a source of supply to the brake cylinder and also operated by a reduction of brake cylinder pressure to admit fluid pressure to said cylinder from a source of supply and to shut off the admission of fluid pressure to said cylinder by the rise of pressure in said cylinder working in combination with the force of the auxiliary reservoir pressure.

Witness my hand this 12th day of June, 1913.

FRANK H. DUKESMITH.

Witnesses:
 THEO. L. POPP,
 ANNA HEIGIS.